Figure 1:
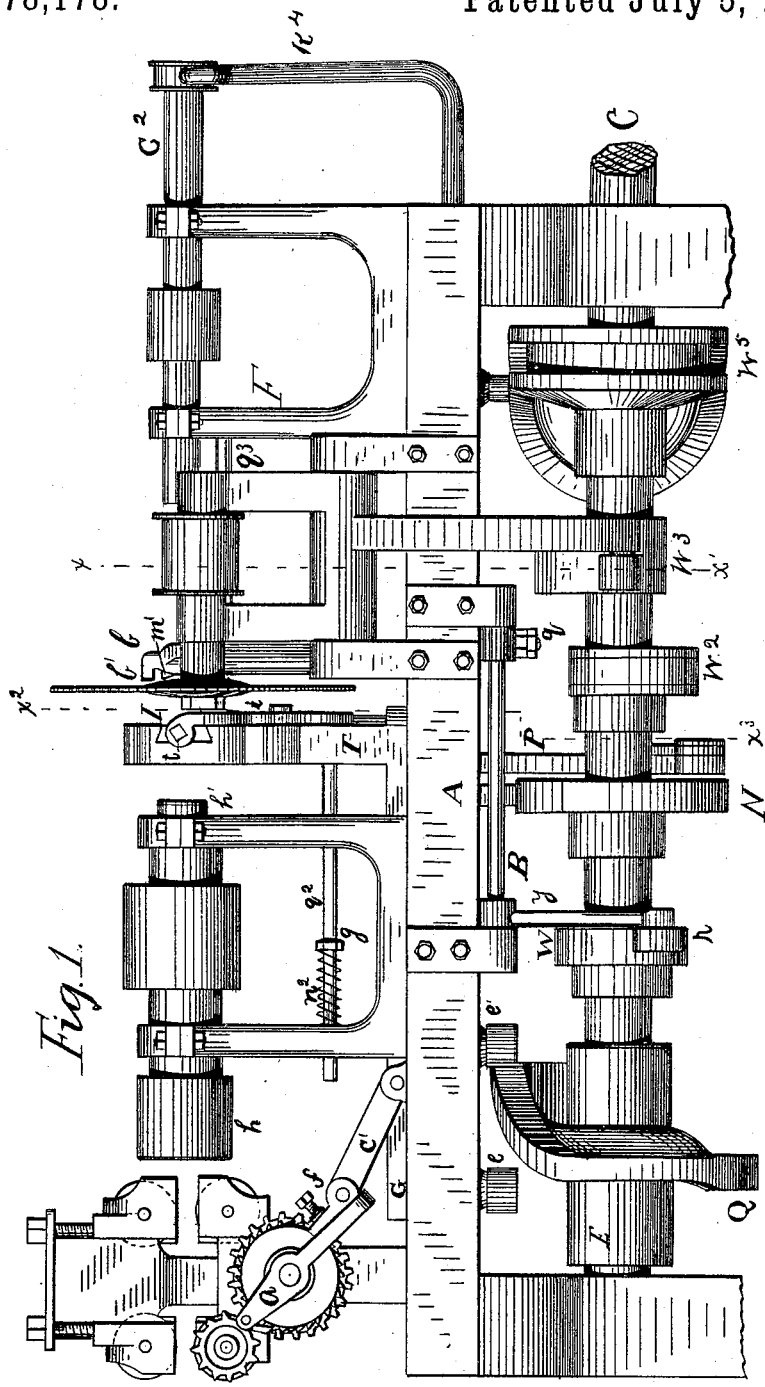

(No Model.) 4 Sheets—Sheet 1.

L. C. TRASK.
GAGE LATHE.

No. 478,178. Patented July 5, 1892.

WITNESSES:
C. E. Norton
John Owen

INVENTOR
Lucius C. Trask
BY Almon Robinson
ATTORNEY.

(No Model.) 4 Sheets—Sheet 2.

L. C. TRASK.
GAGE LATHE.

No. 478,178. Patented July 5, 1892.

WITNESSES:
C. E. Norton
John Owen

INVENTOR
Lucius C. Trask
BY Almon Robinson
ATTORNEY.

(No Model.) 4 Sheets—Sheet 3.
L. C. TRASK.
GAGE LATHE.

No. 478,178. Patented July 5, 1892.

WITNESSES:
C. E. Norton
John Owen

INVENTOR
Lucius C. Trask
BY Almon Robinson
ATTORNEY.

(No Model.) 4 Sheets—Sheet 4.
L. C. TRASK.
GAGE LATHE.

No. 478,178. Patented July 5, 1892.

WITNESSES:
C. E. Norton
John Owen

INVENTOR
Lucius C. Trask
BY Almon Robinson
ATTORNEY.

UNITED STATES PATENT OFFICE.

LUCIUS C. TRASK, OF GREENWOOD, MAINE, ASSIGNOR TO EUGENE L. TEBBETS, OF SAME PLACE.

GAGE-LATHE.

SPECIFICATION forming part of Letters Patent No. 478,178, dated July 5, 1892.

Application filed February 9, 1889. Serial No. 299,339. (No model.)

*To all whom it may concern:*

Be it known that I, LUCIUS C. TRASK, a citizen of the United States, residing at Greenwood, in the county of Oxford and State of Maine, have invented certain new and useful Improvements in Gage-Lathes, of which the following is a specification.

My invention relates to a class of lathes by which thread spools and similar small wooden articles are made automatically from suitable sticks. A lathe of this sort may be considered as made up of a combination of parts for forming rough blanks for spools, &c., a second combination for finishing these rough blanks, and an automatic "finger-motion" for transferring the rough blanks from the first combination to the second, all coacting as parts of one machine to produce automatically-finished spools from roughly sawed or turned sticks. The general construction and mode of operation of such lathes are fully set forth in the specification of United States Patent No. 235,562, which was issued to John M. Parker December 14, 1880.

The object of my invention is to provide a machine which shall be more convenient and accurate in its adjustment and operation and less liable to breakages and disarrangement than those heretofore in use. In the operation of lathes of this sort grooved rollers feed a squared stick into a hollow revolving tool, called a "rougher," which turns it to a cylindrical form. After passing through a guide-bushing in the end of the hollow arbor of the rougher the stick is seized by a pair of gripping-jaws, which are mounted upon a sliding plate that has a back-and-forth motion corresponding to the length of the spool or other piece to be turned. The stick next passes over a supporting-standard, upon which it is clamped by a vertically-moving jaw, while a swinging saw cuts off a spool-blank and a bit bores a central hole through it. This spool-blank is held in place until it is seized by the fingers, which carry it to the revolving arbor, upon which it is finished.

In the lathe as heretofore constructed it is extremely difficult to keep the gripping-jaws from cramping the stick against the guide-bushing of the rougher. My invention comprises efficient means of adjusting these gripping-jaws.

My invention further comprises a device by means of which the stick is moved backward after the spool-blank is severed, so as to leave a space which the finger of the carrying device can enter without risk of hitting either the stick or the blank.

My invention further comprises an improved combination of parts for giving the proper motion to the clamping-jaw which holds the spool-blank in place while it is bored and sawed off.

My invention further comprises certain changes in the clamping-jaw and supporting-piece whereby I avoid the danger of breakage from short blocks catching between the sliding frame of the gripping-jaws and the clamping-jaw or its support.

My invention further consists in introducing between the swinging arm which carries the finger-motion and the cam which actuates it an intermediate swinging arm turning upon the same axis and having an adjustable connection with the arm first mentioned.

My invention further comprises an improved connection between the feed-rolls and gripping-jaws and an attachment whereby I am enabled to stop the machine from either end.

In the accompanying drawings I have only shown so much of the lathe as is necessary to make plain the working of my improvements therein, omitting, for greater clearness various details well known in the construction of lathes of this sort and for the most part fully set forth in the above-mentioned United States Patent No. 235,562.

Figure 2:
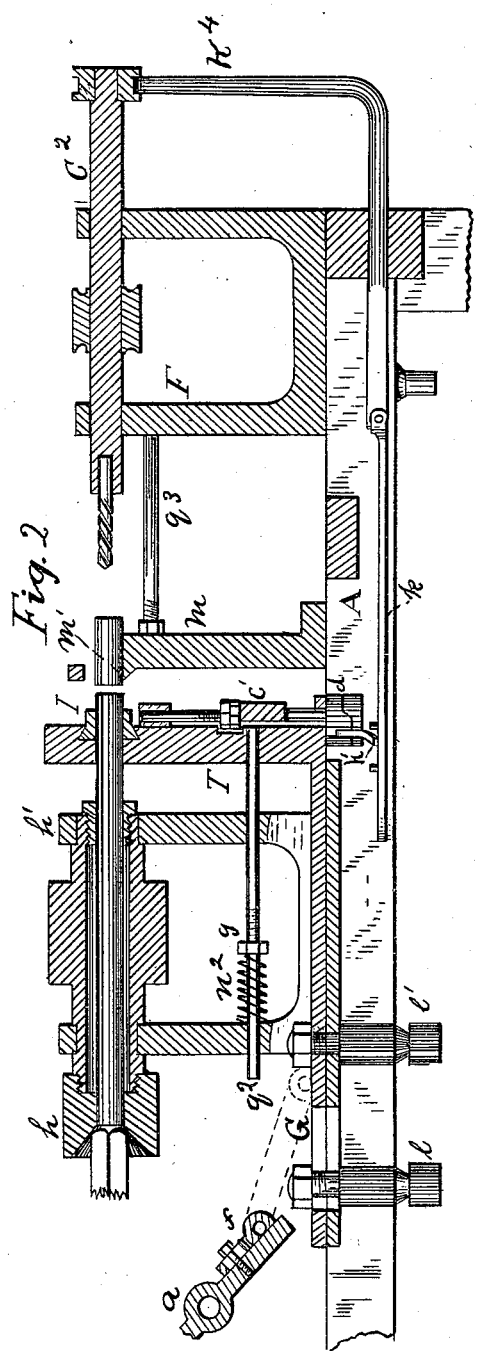
Figure 3:
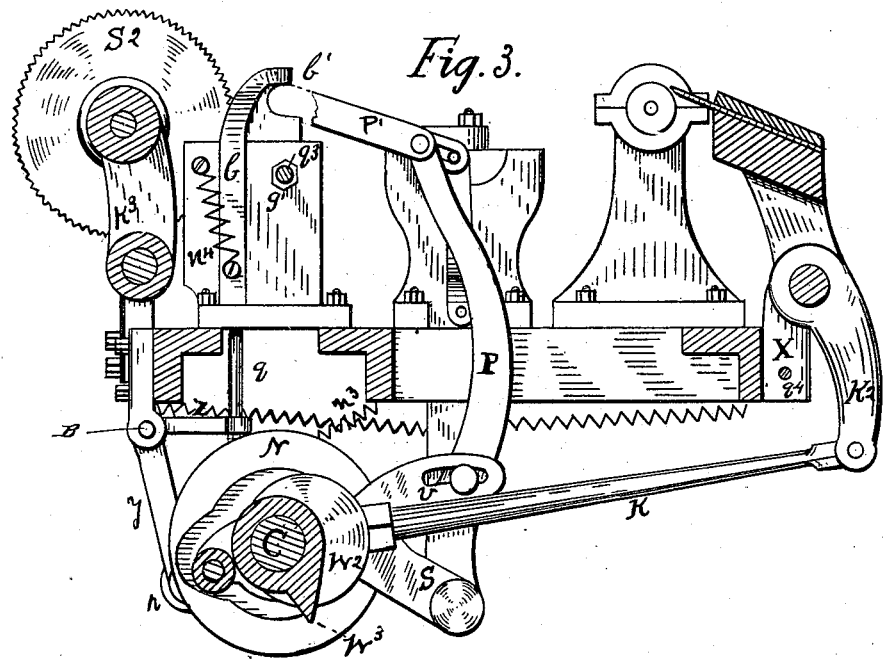
Figure 4:
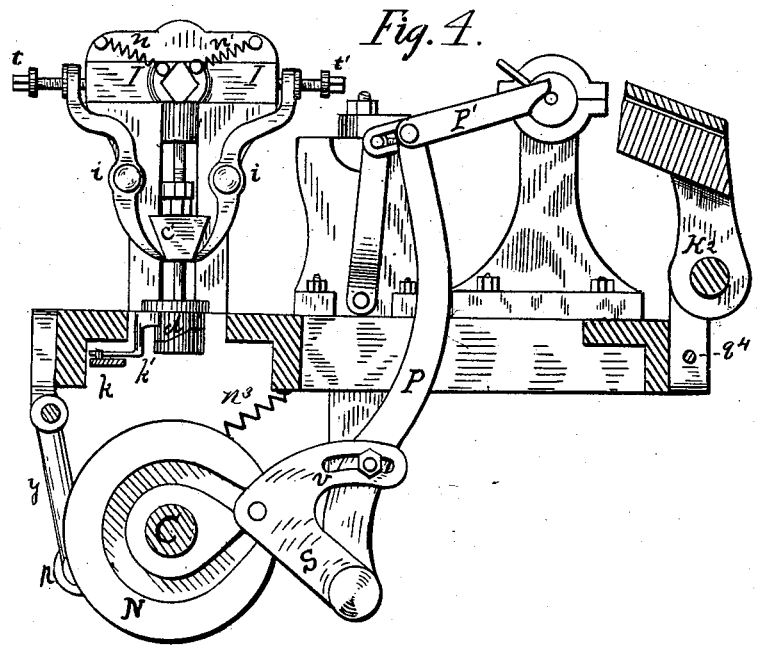
Figure 5:
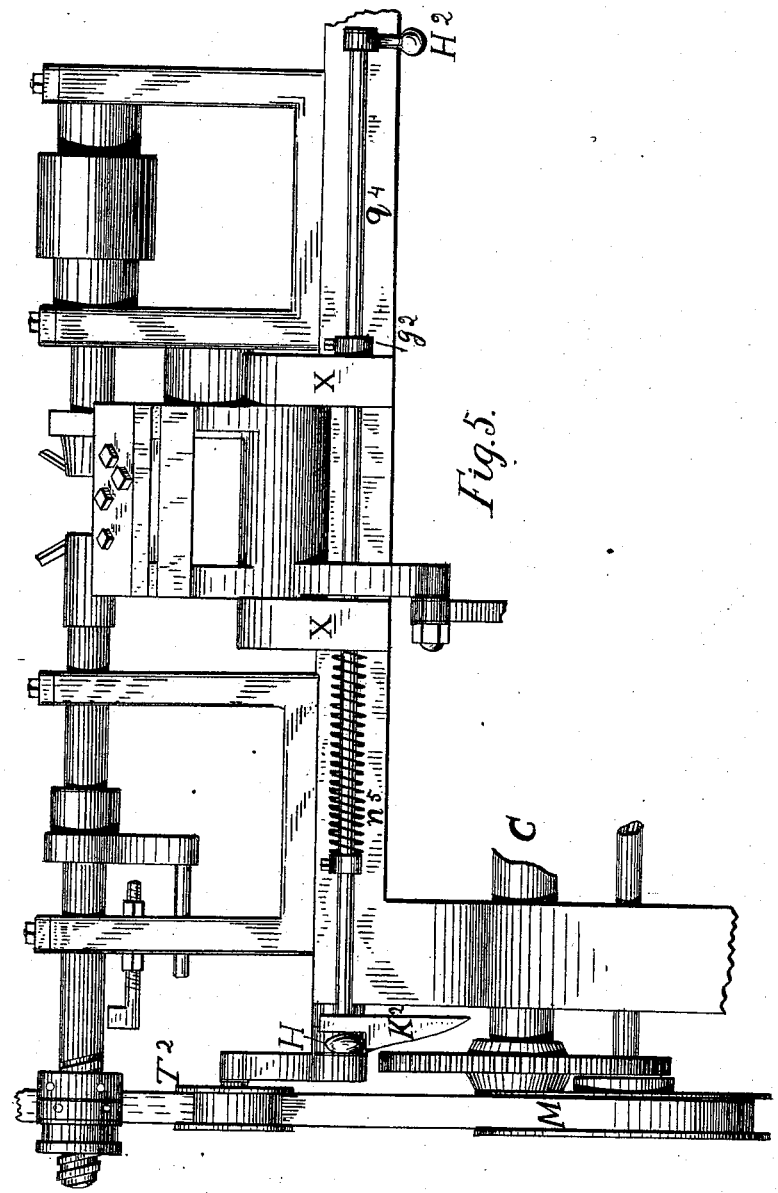

Figure 1 is a back elevation of the machine, showing the parts which form the rough blanks. Fig. 2 is a partial longitudinal section through the center line of the roughing and boring tools. It also shows in dotted line and partial section the improved connection between the two devices for feeding the rough stick. Fig. 3 is a cross-section through the line $x\,x'$ of Fig. 1. Fig. 4 is a cross-section through the line $x^2\,x^3$ of Fig. 1. Fig. 5 is a partial front elevation showing the power connections of the cam-shaft from which the automatic movements of the machine are derived and the mechanism for stopping this cam-shaft from either end of the machine.

In the figures, A is the main frame of the machine.

C is a cam-shaft from which the principal automatic movements of the machine are derived.

E is a cam from which the back-and-forth movements of the sliding plate G are derived through the rollers $e$ $e'$, which are attached to its under side.

T is a supporting-piece rigidly attached to the sliding plate G and carrying the sliding jaws I I, the swinging arms $i$ $i$, the adjusting-screws $t$ $t$, the springs $n$ $n'$, and the wedge $c$ and cam $d$.

Q is a projection on the cam E, from which the special backward motion herein described is derived.

$n^2$ is a spring which reacts through the rod $q^2$ against the motion produced by the projection Q.

$g$ is an adjusting-nut upon the rod $q^2$.

$a$ is an arm carrying the pawl which turns the feed-wheels.

$f$ is a slotted piece adjustable upon the back of $a$; $c'$, a rod connecting $f$ with G.

$h$ is the rougher; $h'$, the guide-bushing.

W is the cam from which the motion of the clamping-jaw is derived.

$r$ is a roller bearing upon the cam W; $y$, a swinging arm upon the rock-shaft B; $n^3$, a spring reacting against the cam W; Z, a second arm moving with the rock-shaft B; $q$, a rod connecting Z with the clamping-jaw $b$; $n^4$, a spring acting to pull the jaw $b$ upward; $b'$, a sidewise projection of the jaw $b$; $m$, a supporting-piece for the spool-blank; $m'$, a sidewise projection of $m$; $g^3$, a pressure-rod reacting between the supporting-piece $m$ and the frame F of the boring device; $g'$, an adjusting-nut upon $q^3$.

P is a swinging arm upon which the finger-motion is mounted, that carries the spool-blanks to the finishing-arbor.

N is a cam from which the arm P derives its motion; S, an intermediate swinging arm transmitting motion from the cam N to the arm P.

$v$ is an adjustable connection between S and P.

The eccentric $W^2$ transmits through the eccentric-rod K a vibrating motion to the piece $K^2$, upon which are mounted the tools which finish the surface of the spool.

$S^2$ is the cutting-off saw, mounted upon the swinging frame $K^3$, which receives its motion from the cam $W^3$.

$C^2$ is the boring-shaft, which receives a back-and-forth motion from the cam $W^5$ through the sliding fork $K^4$. To this sliding fork is attached the rod $k$, Fig. 2. Pins upon the upper surface of $k$ strike the crank $K'$ and turn the cam $d$ through a sufficient angle to draw down the wedge $c'$, the amount necessary to tighten the jaws I I' upon the stick to be fed forward.

M in Fig. 5 is the pulley which drives, through an intermediate gear, the cam-shaft C.

$T^2$ is a tightening-pulley which is pressed against the driving-belt of M by lifting the lever H, which, when lifted, is supported by the catch $K^2$.

X X are projecting pieces upon the front of the machine, which support the swinging frame that carries the tools for finishing the spool.

$q^4$ is a rod sliding through X X.

$n^5$ is a spring which presses $K^2$ outward; $g^2$, a stop which limits its motion in that direction, and $H^2$ a handle by which the catch $K^2$ is pulled from under H.

In using my invention I first adjust the sliding piece $f$ upon the ratchet-arm $a$ until the motions of the feed-wheels and of the gripping-jaws are in proper relation. The gripping-jaws I I are then adjusted by turning the screws $t$ $t$ until the turned rod moves freely through the guide-bushing $h'$. I then adjust the pressure-rod $q^3$ by means of the nut $g'$ until it is so firmly fixed that it will be sure to transmit to the frame of the boring device any pressure upon the clamping-jaw $b$ or its connections which comes from the direction of the gripping-jaws. I then adjust the angular distance between the arms S and P until the finger-arm P assumes the position shown in Fig. 3 at one end of its motion and the position shown in Fig. 4 at the other. The peculiarities of this finger-motion form no part of my present invention and are fully set forth in Parker's United States Patent hereinbefore mentioned. When the machine is set in motion, the projection upon the cam E moves the gripping-jaws I I' and the stick which they hold back a sufficient distance to permit the carrying-finger to pass with safety between the stick and the severed block. The spring $n^2$, acting through the rod $q^2$, prevents the inertia of the moving parts from carrying them farther back after the cam ceases to act. The cam W, acting through the rock-shaft B and its connections, causes the clamping-jaw to press down upon the end of the stick until the spool-blank is severed and seized by the carrying-fingers. The projections $b'$ and $m'$ seize the stick quite closely to the cutting-off saw; but if a block happens to be sawed off which is not held properly by the clamping-jaw it usually falls under the overhanging piece $m'$, and even if a block happens to be caught in any way between the gripping and the clamping apparatus the rod $q^3$ transmits a part of the strain to the frame of the boring device and the block is crushed without damage to the machine.

Having now fully described my invention, what I claim, and desire to secure by Letters Patent, is—

1. In an automatic spool-lathe, gripping-jaws for the rough-turned stick, which are mounted upon a sliding plate, and a roller by which motion is transmitted to the sliding plate from the actuating-cam, in combination with a projection upon the back of the actuating-cam and a spring reacting against the projection when the said projection is placed at such a point upon the cam that it acts to move the plate back while the jaws are gripped upon the stick and after the saw has cut off the block, all as and for the purpose set forth.

2. The combination of the sliding plate G, connecting-rod $c'$, arm $a$, and feed-rolls actuated thereby, with a slotted connecting-piece mounted upon the back of arm $a$ for the purpose of varying its working length.

3. The combination of a vertically-clamping jaw $b$, having a projecting part $b'$, with a supporting-piece $m$, having a similar projection $m'$, all as and for the purpose set forth.

4. The combination of the finger-motion arm P, cam N, intermediate arm S, and adjustable connection V, all as and for the purpose set forth.

5. In an automatic spool-lathe in which spool-blanks are severed from the end of a turned stick, a clamping-jaw which holds the severed blank in place while being bored, a rock-shaft, jointed connections between the jaw and the rock-shaft, and a cam upon the principal cam-shaft, which imparts motion to the rock-shaft, all in combination with each other and with a boring-tool which bores an axial hole in the block and a cutting-off saw which moves at right angles thereto, substantially as specified.

LUCIUS C. TRASK.

Witnesses:
TIMOTHY M. BEAN,
FRED H. MORTON.